United States Patent [19]

Böddeker

[11] 3,954,925

[45] May 4, 1976

[54] METHOD OF MAKING SEMI-PERMEABLE ASYMMETRIC MEMBRANES FOR REVERSE OSMOSIS

[75] Inventor: Karl W. Böddeker, Juliusberg, Germany

[73] Assignee: Gesellschaft fur Kernenergieverwertung in Schiffbau u. Schiffahrt mbH, Geesthacht-Tesperhude, Germany

[22] Filed: Sept. 19, 1974

[21] Appl. No.: 507,471

Related U.S. Application Data

[63] Continuation-in-part of Ser. No. 426,903, Dec. 20, 1973, abandoned.

[30] Foreign Application Priority Data

Dec. 20, 1972 Germany............................ 2262315

[52] U.S. Cl. ............................ 264/41; 210/500 M; 264/217
[51] Int. Cl.² ........................................ B29D 27/04
[58] Field of Search........................ 264/41, 49, 217; 210/500 M

[56] References Cited
UNITED STATES PATENTS 3,290,286  12/1966  Kesting ............................ 264/49 X
3,444,286  5/1969  King et al. ........................ 264/41 X

OTHER PUBLICATIONS

Böddeker, K. W., J. Kaschemekat and H. Woldmann, "Ammonia as Modifying Agent for Cellulose Acetate Membranes," in Proceedings of the Fourth International Symposium on Fresh Water From the Sea, Heidelberg, 9–14, Sept. 1973, Vol. 4, pp. 65–71 (reprint).

*Primary Examiner*—Philip Anderson
*Attorney, Agent, or Firm*—Walter Becker

[57] ABSTRACT

A method of making semi-permeable asymmetric membranes for desalting water in conformity with the method of reverse osmosis from a cellulose acetate casing mixture to which as modifying component there is added ammonia, preferably in gaseous condition, as swelling substance. Preferably a solution of cellulose acetate in acetone is employed into which the gaseous ammonia is introduced up to the desired concentration at room temperature, e. g. of 22° C. Casting of the film followed by a brief evaporation period prior to gelling the film in cold water is done at room temperature.

5 Claims, No Drawings

METHOD OF MAKING SEMI-PERMEABLE ASYMMETRIC MEMBRANES FOR REVERSE OSMOSIS

This is a continuation-in-part of co-pending application Ser. No. 426,903-Böddeker filed Dec. 20, 1973 and, now abandoned.

The present invention concerns a method of producing semi-permeable asymmetric membranes for desalinating water in conformity with the method of reverse osmosis from a cellulose acetate casting mixture (Giesslösung) to which as modifying component there is added a swelling substance. The asymmetric membranes frequently described in the literature are water containing swollen polymer films which consist of a very thin practically pore-free skin over a spongy porous carrier layer which nearly represents the entire thickness of the membrane. Only the homogeneous skin has under the conditions of reverse osmosis desalinating properties, whereas the porous carrier layer does not contribute appreciably to the desalination operation. Asymmetric membranes, therefore, are effectively very thin membranes by means of which, in contrast to thicker symmetric separating diaphragms, technically useful product water flows can be obtained.

The production of integral-asymmetric cellulose acetate membranes, comprising a number of steps as outlined below, starts with a pourable solution of a secondary cellulose acetate in a suitable solvent or solvent mixture which as a third component has added thereto a so-called swelling agent which, in its turn, may be a mixture of substances. This modifying component has a decisive influence upon the morphology and thereby the properties of the membrane with regard to product water flux and the ability of rejecting salt; only by incorporating a swelling agent useful integral-asymmetric membranes are obtained. The most widely accepted swelling agent which has also been adopted by commercial membrane manufacturers is the substance known under the name "formamide" (S. Manjikian, S. Loeb, J. McCutchan, Proceedings of the First International Symposium on Water Desalination, Washington, D. C., 1965). A typical casting mixture consists, for example of 25% by weight of cellulose acetate which represents the membrane former proper, 45% by weight of acetone as solvent, and 30% by weight of formamide as swelling agent. Thus, proportionally there is employed as much of a swelling agent as there is employed membrane former.

A drawback of the formamide consists in that it is a skin and breathing poison which has a teratogenic effect, which means that it can produce malformations.

It is, therefore, an object of the present invention to provide an improved manufacturing process for making membranes with a particularly inexpensive swelling agent which does not have the disadvantageous properties of the formamide and can be employed in small quantities.

This object and other objects and advantages of the invention will appear more clearly from the following specification.

More specifically, the method according to the present invention is characterized primarily in that as swelling agent ammonia is employed which is introduced, preferably in gaseous condition, into the solution of a secondary cellulose acetate in acetone, followed by a membrane forming process according to the so-called phase inversion method (cf. R. E. Kesting: Synthetic Polymeric Membranes. McGraw-Hill, New York 1971).

The following is a more detailed description of the process embodying the objects of the present invention.

The process starts with the preparation of a solution of a secondary cellulose acetate in acetone at a ratio from 1:2 to 1:3 by weight, preferably at a ratio of 1:2.5. Into this solution there is introduced ammonia in gaseous condition (that is, anhydrous ammonia) up to the desired concentration at room temperature, e.g. at 22° C, in either one of two ways. The ammonia may be incorporated, while mechanically agitating the solution, through a gas dispersion frit. A preferred variant of this method is based on the observation that the solutions under consideration readily absorb gaseous ammonia at ambient temperature out of a stream of gaseous ammonia directed over the surface of the solution. Agitation in this case is effected by rotating the solution, e.g. in a rotary evaporator type apparatus.

The futher manufacturing steps are analogous to those practiced in the art (cf. References Cited). Membranes are cast from the above casting mixtures with a film drawing device such as used for coating plates in thin layer chromatography or the like, at a slit width of typically 0.3 mm. It should be noted that the casting of the film and the subsequent partial evaporation of the volatile constituents, as is called for in the preparation of asymmetric membranes, may be done at room temperature, e.g. 22° C. As in the case of formamide-modified membranes this circumstance represents a marked improvement over the heretofore known membrane manufacturing recipes which require cooling measures.

Following a defined time of exposure to ambient air (evaporation time) the films are immersed in cold water of 0° to 2° C, thereby initiating a phase inversion reaction which leaves the membrane in the form of a water-swollen anisotropic gel of cellulose acetate. Both the solvent (acetone) and the swelling agent (ammonia) are leached out of the membrane during this step. The evaporation time of the freshly cast film prior to immersion in water which with formamide membranes must be held in narrow limits (from 5 to 10 seconds) can be extended with ammonia membranes to a period of from 10 to 60 seconds, preferably to a period of 20 seconds. This facilitates the procedure in the case of discontinuous membrane fabrication.

The final step in the manufacturing procedure is the heat treatment of the membranes which offers a means to adjust the membrane properties with respect to product water flux and salt rejection to a desired level. For most applications in the field of water desalination the heat treatment involves heating the membrane for 5 minutes in water at a temperature of 70° to 85° depending on the desalination requirements. The membrane is now ready for use; it is anisotropic or asymmetric in that it should be used with the air-exposed surface facing the salt solution in the reverse osmosis process.

A particular advantage of ammonia as swelling agent is the low concentration required. Using the above ratios of cellulose acetate to acetone the best results are obtained with an ammonia content of from 2 to 5% by weight. Thus a typical casting mixture according to the invention has the following composition.

| Example: | cellulose acetate, | 27.5% by weight |
|---|---|---|
| | acetone, | 68.7% by weight |

| | |
|---|---|
| ammonia, | 3.8% by weight |

The cellulose acetate employed is sold commercially by the Eastman-Kodak Co. Two types, designated by the manufacturer as E-398-3 and E-400-25 were used as received.

The investigation of the new membrane type according to the present invention has shown that at a comparable level of salt rejection ability ammonia-modified membranes may yield higher initial fluxes than is the case with formamide standard membranes. A further potential advantage of the ammonia membranes consists in the low required concentration of the swelling agent which results in a reduction in the cost of manufacturing membrances.

It is, of course, to be understood that the present invention is, by no means, limited to the specific example set forth above, but also comprises any modifications within the scope of the appended claims.

What I claim is:

1. In a phase-inversion a method of making semipermeable asymmetric membranes for the desalination of water according to the reverse osmosis method, the improvement comprising in combination the steps of preparing a pourable cellulose acetate solution consisting essentially of cellulose acetate and acetone at a ratio within the range of from 1:2 to 1:3, and adding thereto ammonia within the range of from 2 to 5% by weight as the sole swelling agent.

2. A method in combination according to claim 1, in which said cellulose acetate is a secondary cellulose acetate, and in which said ammonia is introduced into said cellulose acetate solution in gaseous anhydrous condition at room temperature.

3. A method in combination according to claim 1, in which the membranes being produced are cast at normal room temperature followed by a brief evaporation period likewise at room temperature, immersed in cold water and finally subjected to a heat treatment.

4. A method in combination according to claim 3, in which the membrane properties are controlled by varying the ammonia content, the evaporation period, and the heat treating temperature.

5. A method in combination according to claim 4, in which the heat treating step involves heating at a temperature of between 70° and 85°C for approximately 5 minutes.

* * * * *